US007486296B2

(12) United States Patent
Yao

(10) Patent No.: US 7,486,296 B2
(45) Date of Patent: Feb. 3, 2009

(54) CARICATURE GENERATING SYSTEM AND METHOD

(75) Inventor: Yu-Sheng Yao, Xindian (TW)

(73) Assignee: Reallusion Inc., Taipei County (TW)

( * ) Notice: Subject to any disclaimer, the term of this patent is extended or adjusted under 35 U.S.C. 154(b) by 385 days.

(21) Appl. No.: 11/211,608

(22) Filed: Aug. 26, 2005

(65) Prior Publication Data

US 2006/0082579 A1    Apr. 20, 2006

(30) Foreign Application Priority Data

Oct. 18, 2004    (TW) ............................... 93131598 A

(51) Int. Cl.
 G06T 11/80 (2006.01)
 H04N 1/387 (2006.01)
 G09G 5/00 (2006.01)
 G06F 3/033 (2006.01)
 A63F 13/10 (2006.01)

(52) U.S. Cl. ....................... 345/473; 345/581; 345/619; 345/630; 345/646; 382/266; 382/276; 382/284; 382/254

(58) Field of Classification Search ................ 382/276, 382/282, 284, 289, 291, 299, 201–202, 181, 382/195, 254, 274, 285, 295; 345/646–650, 345/467–469, 428, 473, 581–582, 589, 593, 345/619, 630, 606, 600, 611, 629, 470; 715/502, 715/700

See application file for complete search history.

(56) References Cited

U.S. PATENT DOCUMENTS

2003/0206171 A1* 11/2003 Kim et al. ................... 345/473
2004/0205483 A1* 10/2004 Massarsky ................ 715/500.1
2005/0100243 A1*  5/2005 Shum et al. ................. 382/276
2005/0212821 A1*  9/2005 Xu et al. ..................... 345/647

OTHER PUBLICATIONS

Posterization-Wikipedia, the free encyclopedia, http://en.wikipedia.org/wiki/Posterization, pp. 1-2.*
PicToon: A personalized Image-based Cartoon System, Hong Chen et al., Microsoft research, Asia, pp. 1-7.*
Making Cartoons, http://www.justkiss.com/psp/paint4.htm, Centreville 200, pp. 1-3.*

* cited by examiner

Primary Examiner—Wesner Sajous
(74) Attorney, Agent, or Firm—WPAT.P.C.; Justin King

(57) ABSTRACT

A caricature generating system and method. The caricature generating system comprises an edge tracing and stroking unit, a posterizing and texturing unit, an image blending unit, a facial image adjusting unit, a cartoon theme composition unit, a styling parameters database comprising a plurality of styling parameters including the control parameters for edge tracing, stroking, posterizing, and texturing, a face adjusting parameter database comprising a plurality of face adjusting parameter set, and a cartoon theme database comprising a plurality of cartoon themes, thereby creating a caricature from a facial image. The styling parameters (including the control parameters for edge tracing, stroking, posterizing, and texturing), created manually or by a software, comprise oil paint, pastel, a wax crayon, marker pen, pen drawing, tempera paint, glue color paint, halftone, watercolor paint, block print, woodcut, color pencil, charcoal and their combinations. The face adjusting parameter set comprise adjustment factors of facial features and facial expression. The cartoon themes provide various themes for the caricature.

1 Claim, 17 Drawing Sheets

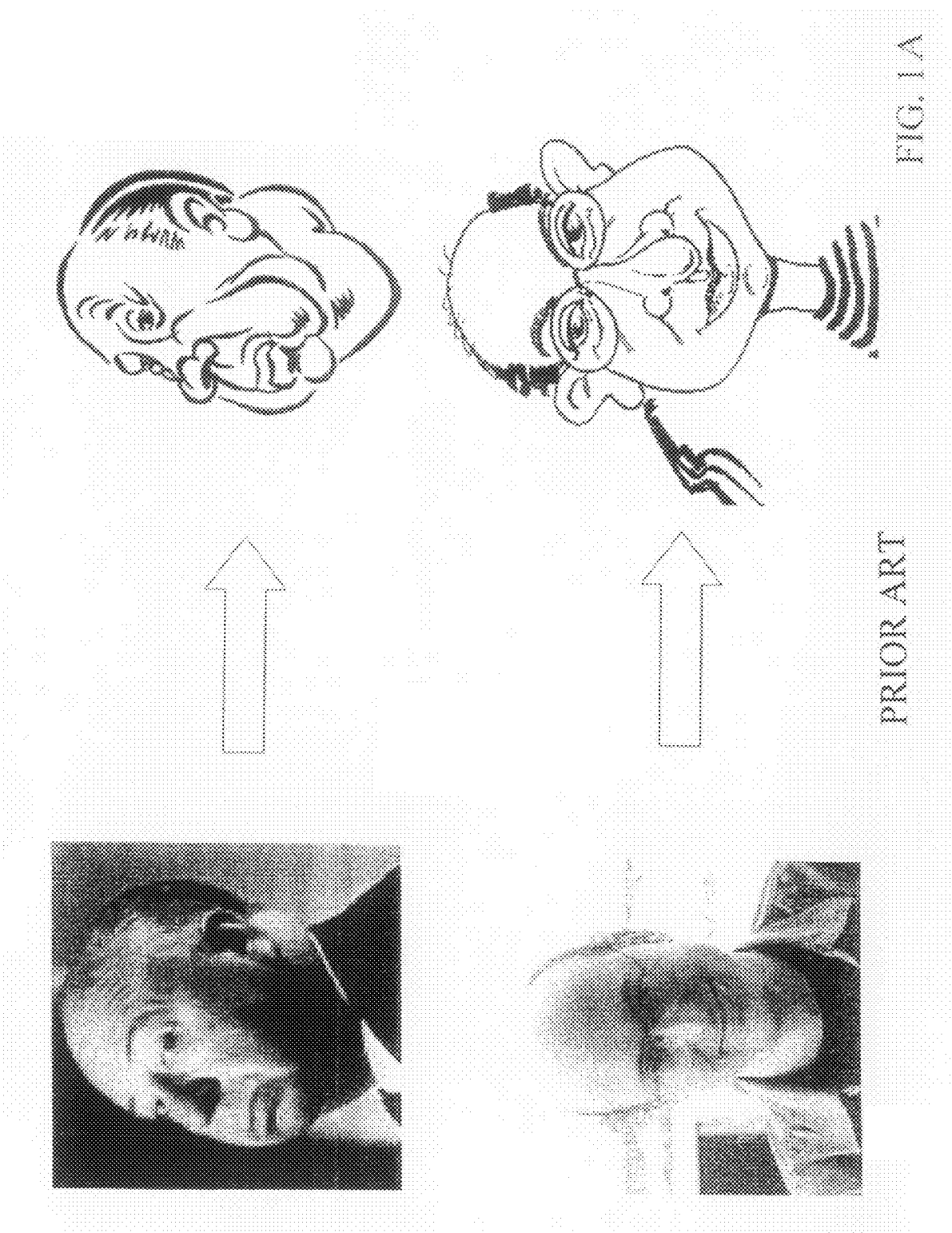

CARICATURE GENERATING SYSTEM AND METHOD

BACKGROUND

The invention relates to a caricature generating system and method, and in particular to a caricature generating system and method employing an edge-tracing and stroking unit, a posterizing and texturing unit, an image blending unit, a facial image adjusting unit, a cartoon theme composition unit, styling parameters, a face image adjusting parameter, and a cartoon theme database.

PRIOR ART

Typically, a caricature is created by an artist's hand drafting based on a real person or photos as shown in FIG. 1A. The artist simplifies and stylizes the outlines of the person and exaggerates the facial features. As done manually, the artist draw the caricature must be very skillful and talented, and it takes a long time to do so.

A software capable of creating a funny character quickly is shown in FIG. 1B. It is, however, limited to types and numbers of facial parts provided, and is difficult to achieve a combination imitating a real person. Such software is more like a game then an artist tool.

Filter functions in image processing software are commonly used. Example like the distort filters in Adobe PhotoShop are employed to twist a facial image for certain funny effects as shown in FIG. 1C. In such case, only the shape of the image can be changed, stroke effects, however, cannot be created in this way. Moreover, such a complicated image processing software must be operated by a professional with esthetics talent and computer skills. The process cannot be automated so every photo must be processed individually.

Thus, it is desired to improve the disadvantages in a caricature generating system described above. In an ideal caricature generating system, neither the complicated image processing software, nor a skillful professional of art is needed. In such system, parameters can be used repeatedly and the generation processes of caricature are automatic as well as interactive.

SUMMARY

An object of the invention is to provide a caricature generating system and method. The caricature generating system according to the present invention comprises an edge-tracing and stroking unit, a posterizing and texturing unit, an image blending unit, a facial image adjusting unit, an cartoon theme composition unit, styling parameters (including the control parameters for edge tracing, stroking, posterizing, and texturing) stored in a styling parameter database, face adjusting parameter sets in a face adjusting parameter database, and cartoon themes in a cartoon theme database. A facial image is processed by the units of the system of the present invention and converted into a caricature image in a cartoon theme to improve the efficiency of cartoon production.

Another object of the present invention is to provide a caricature generating system and method. Especially the system and method which process a facial image to create caricatures and cartoon artworks. The system comprises a plurality of databases such as the styling parameter database, face adjusting parameter database, and cartoon theme database. A facial image processing is controlled by the parameters in such various databases and these parameters can be used repeatedly to save time and to simplify the processing of cartoon production.

BRIEF DESCRIPTION OF THE DRAWINGS

The invention can be more fully understood by reading the subsequent detailed description and examples with references made to the accompanying drawings, wherein:

FIG. 1A is a schematic view of a conventional caricature production process.

DETAILED DESCRIPTION

Figure 1B:
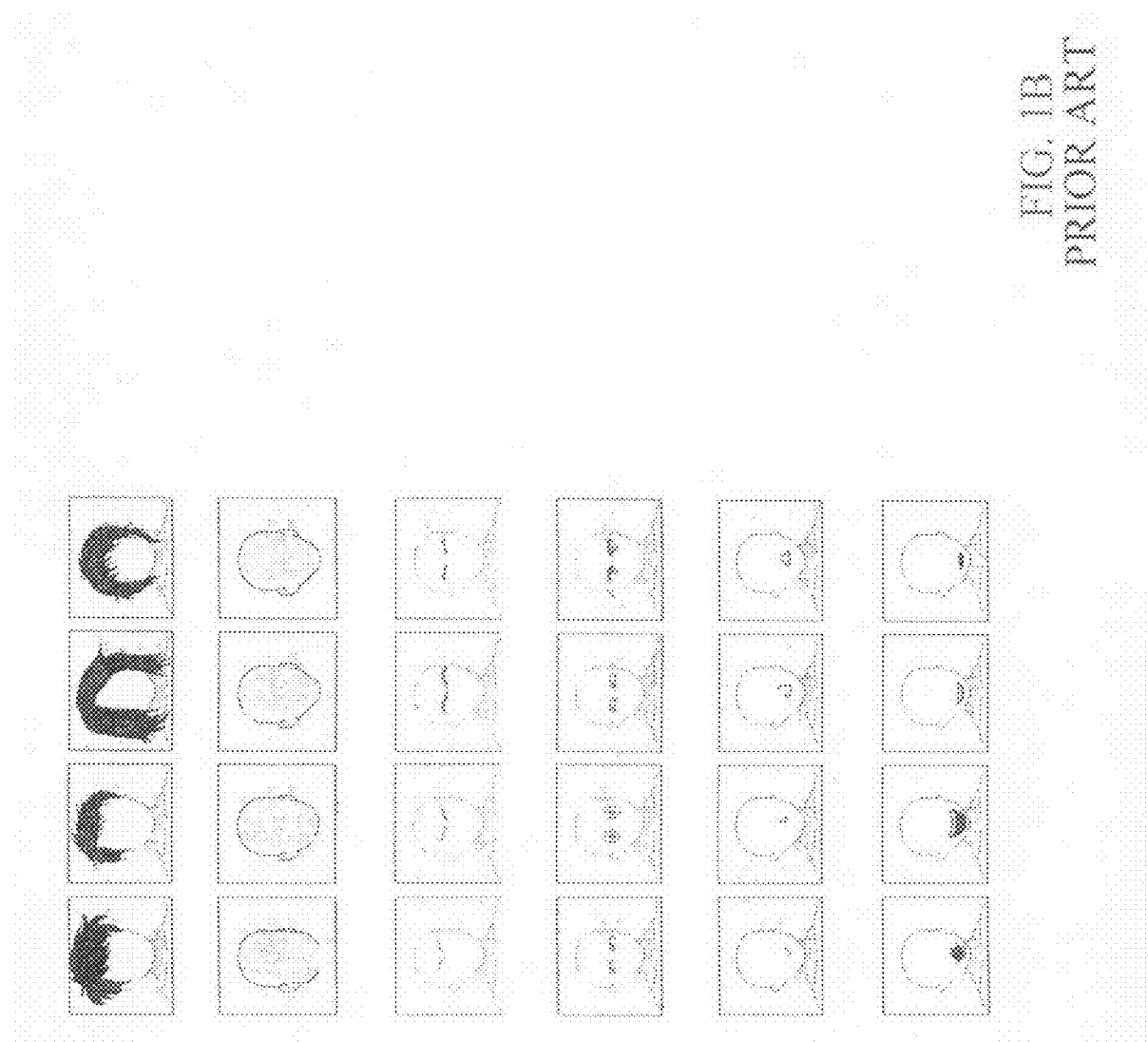
FIG. 1B is a schematic view of another conventional caricature production process.
Figure 1C:
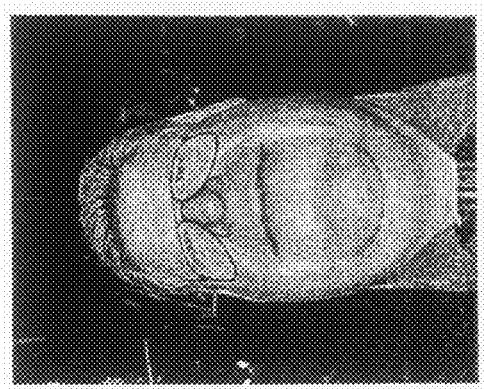
FIG. 1C is a schematic view of another conventional caricature production method.
Figure 1C:
Figure 1C:
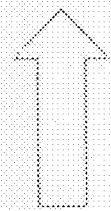
Figure 1C:
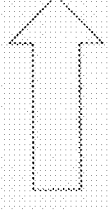
Figure 1C:
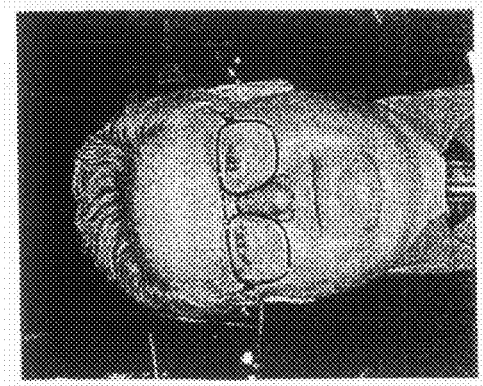
Figure 1C:
Figure 2A:
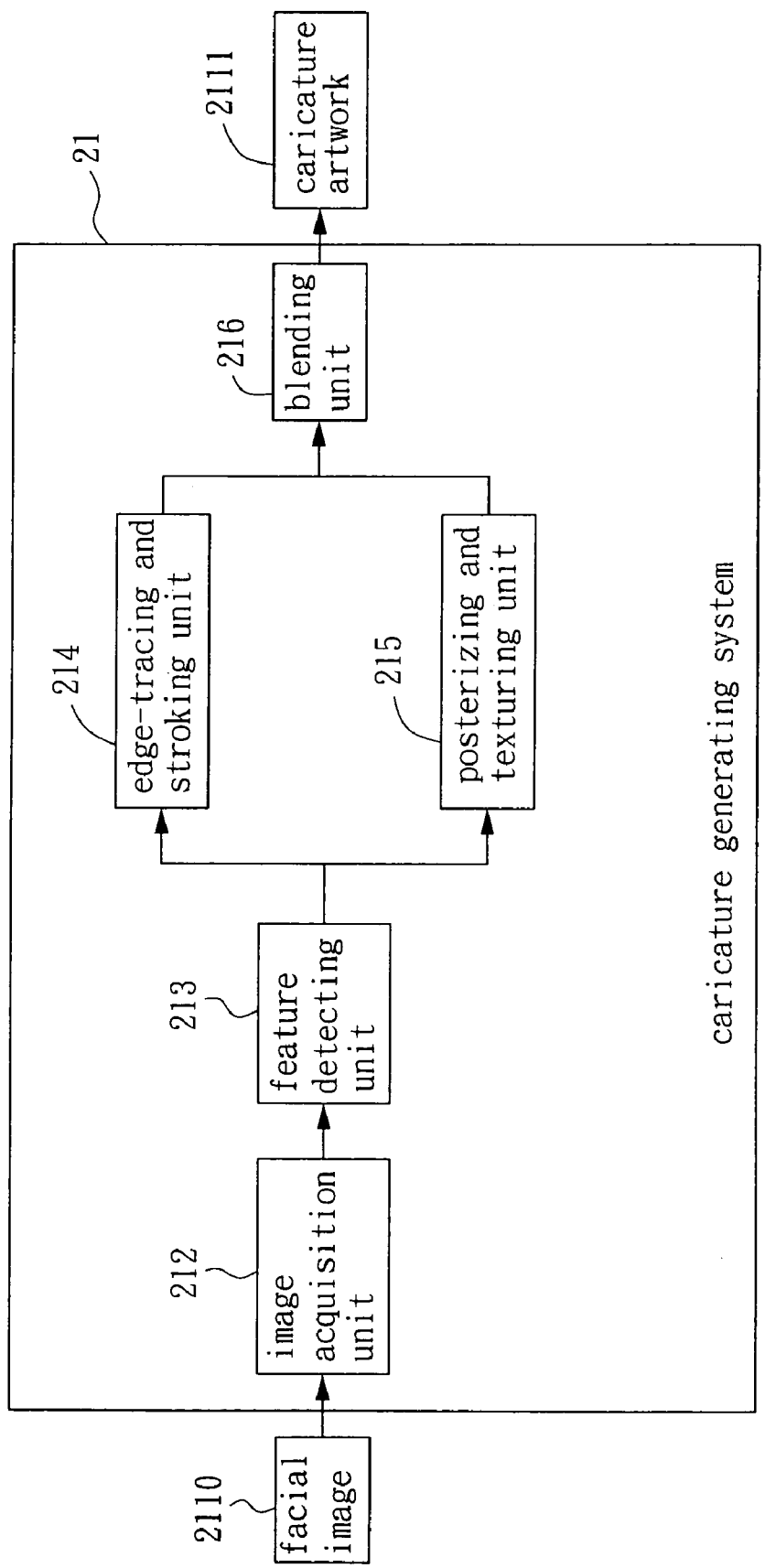
FIG. 2A is a schematic view of an embodiment of a caricature generating system according to the invention.

Referring to FIG. 2A, a caricature generating system 21 comprises an image acquisition unit 212 capturing a facial image, a feature detecting unit 213 identifying and positioning the features of the facial image; an edge-tracing and stroking unit 214 detecting the contours of the facial image and converting the facial image into an outline image with artistic stroking styles; a posterizing and texturing unit 215 posterizing the continuous tone of the facial image and converting the facial image into a texture image with various texture filling styles; and an image blending unit 216 blending the outline image and the texture image to synthesize a hand drawing-like cartoon image. Based on the information detected from the facial image, various portions of the facial image are given different parameter values. For example, thick stroke can be used in the outline of the face and thin stroke can be used in facial features such as eyes, mouth and nose. Fine strokes and textures can be used in facial features, whereas rough strokes and textures can be used in other portions. The composition of different texture filling and outline stroking gives images with different effects such as oil paint, pastel, a wax crayon, marker pen, pen drawing, tempera paint, glue color paint, halftone, watercolor paint, block print, woodcut, color pencil and charcoal.

Figure 2B:
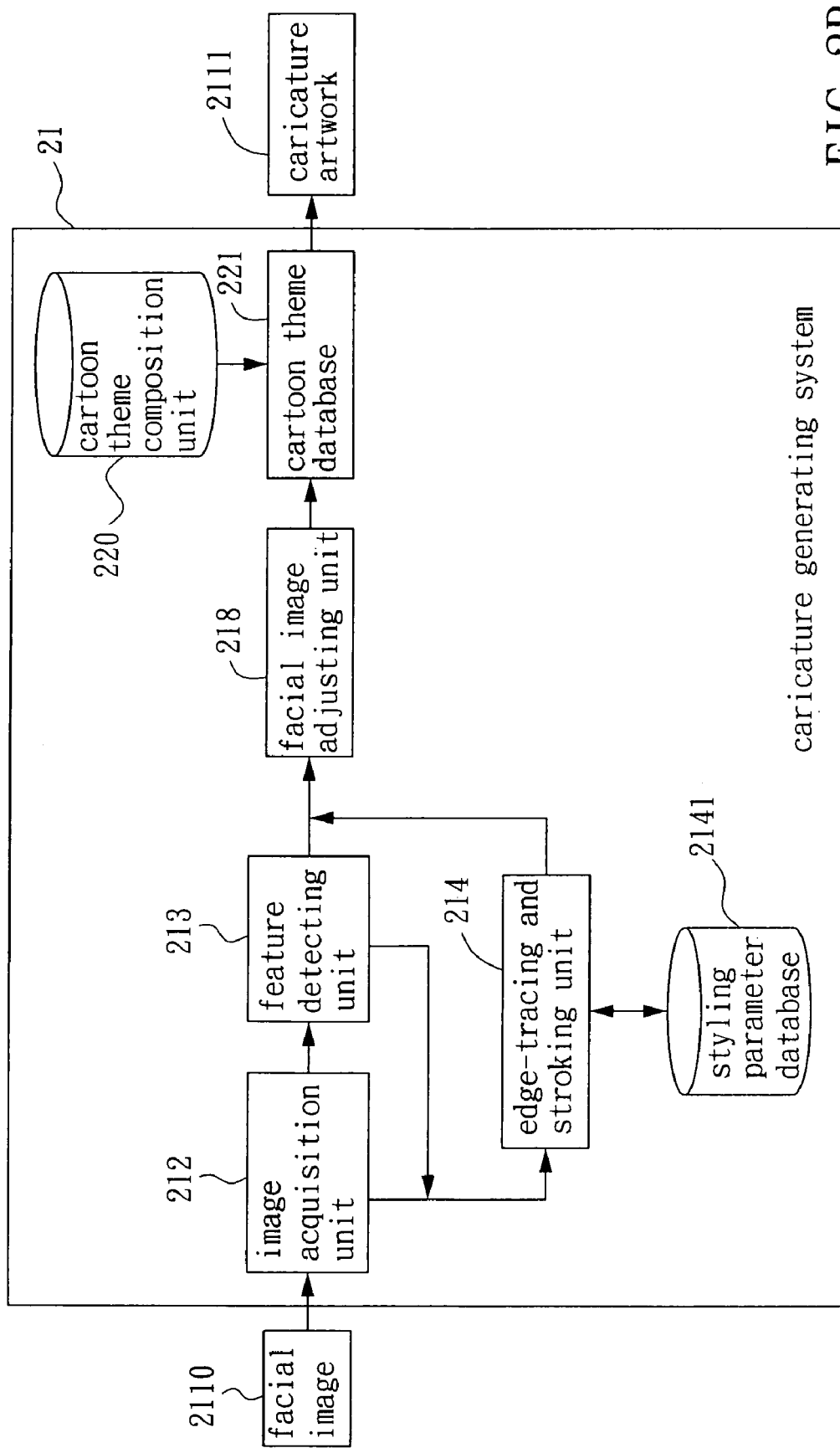
FIG. 2B is a schematic view of another embodiment of a caricature generating system according to the invention.

Referring to FIG. 2B, a caricature generating system 21 comprises an image acquisition unit 212 for capturing a facial image, a feature detecting unit 213 for identifying and positioning the features of the facial image, an edge-tracing and stroking unit 214 for detecting the contours of the facial image and converting the facial image into an outline image with artistic stroking styles, based on the information detected from the facial image, various portions of the facial image are given different parameter values. For example, thick stroke can be used in outline of the face and thin stroke can be used in facial features such as eyes, mouth and nose, a styling parameter database 2141 comprising a plurality of styling parameters (including the control parameters for edge tracing, stroking, posterizing, and texturing) which can be translated into parameter sets of oil paint, pastel, a wax crayon, marker pen, pen drawing, tempera paint, glue color paint, halftone, watercolor paint, block print, woodcut, color pencil, charcoal and their combinations, a facial image adjusting unit 218 for adjusting geometry and color information of the facial image, a cartoon theme database 220 comprising a plurality of cartoon themes, and an cartoon theme composition unit 221 for segmenting a facial area out of the facial image according to the identified features and composing the facial area with a cartoon theme in the cartoon theme database to generate a caricature artwork.

Figure 2C:
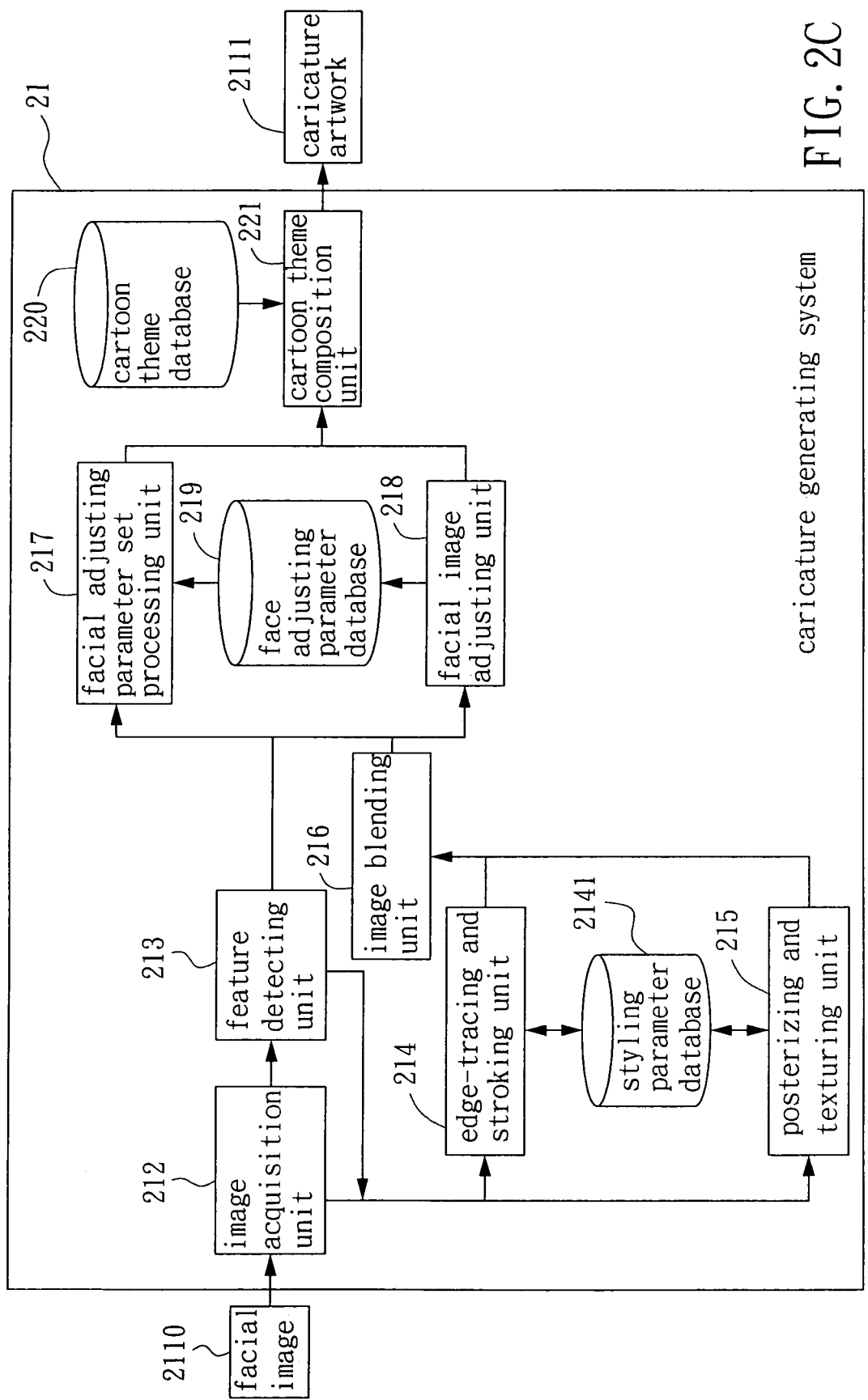
FIG. 2C is a schematic view of another embodiment of another caricature generating system according to the invention.

The caricature generating system of the invention comprises more components to perfect its functions. Referring to FIG. 2C, a caricature generating system 21 comprises an image acquisition unit 212 capturing a facial image, a feature detecting unit 213 for identifying and positioning the features of the facial image, an edge-tracing and stroking unit 214 for detecting the contours of the facial image and converting the facial image into an outline image with artistic stroking styles, based on the information detected from the facial image, various portions of the facial image are given different parameter values. For example, thick stroke can be used in outline of the face and thin stroke can be used in facial features such as eyes, mouth and nose; a styling parameter database 2141 comprising a plurality of styling parameters (including the control parameters for edge tracing, stroking, posterizing, and texturing) which can be translated into parameter sets of oil paint, pastel, a wax crayon, marker pen, pen drawing, tempera paint, glue color paint, halftone, watercolor paint, block print, woodcut, color pencil, charcoal and their combinations; a posterizing and texturing unit 215 for posterizing the continuous tone of the facial image and converting the facial image into a texture image with various texture filling styles, based on the information detected from the facial image, various portions of the facial image are given different parameter values, for example, thin line and fine texture can be applied in facial feature such as eyes, mouth and nose while thick line and rough texture can be used in other portions of the face; an image blending unit 216 for blending the outline image and the texture image to synthesize a hand drawing-like cartoon image, the combination of different outline stroking, texturing and blending gives images with different paint effects, such as, oil paint, pastel, a wax crayon, marker pen, pen drawing, tempera paint, glue color paint, halftone, watercolor paint, block print, woodcut, color pencil, charcoal and their combinations; a facial adjusting parameter set processing unit 217 for processing face adjusting parameter sets from a face adjusting parameter database; a facial image adjusting unit 218 for adjusting geometry and color information of the facial image interactively and saving facial image adjusting parameter set into the face adjusting parameter database; a face adjusting parameter database 219 comprising a plurality of face adjusting parameter sets; a cartoon theme database 220 comprising a plurality of cartoon themes; and a cartoon theme composition unit 221 for segmenting a facial area out of the facial image according to the identified features and composing the facial area with a cartoon theme to generate a caricature artwork.

Figure 2D:
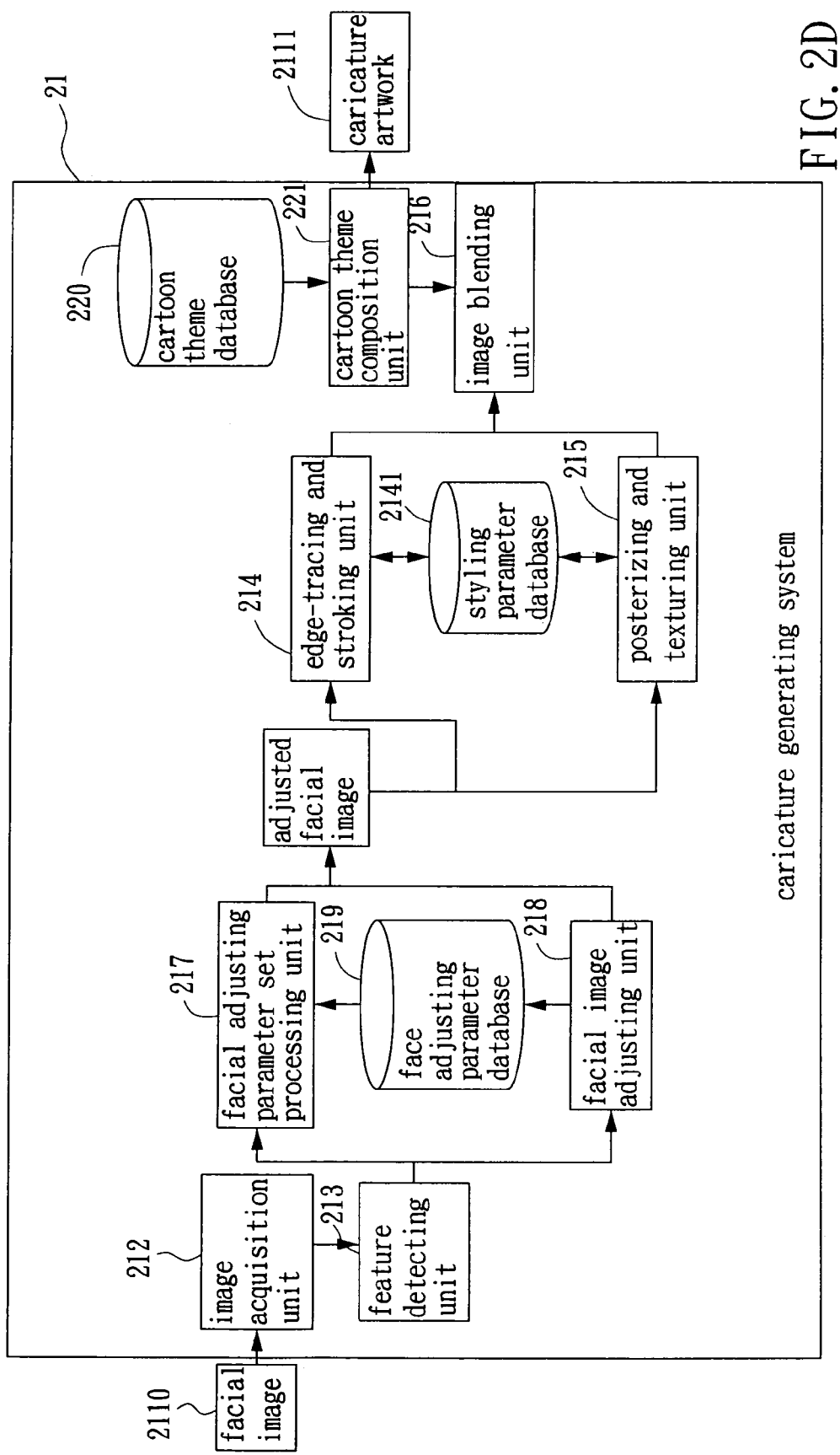
FIG. 2D is a schematic view of another embodiment of a caricature generating system according to the invention.

FIG. 2D shows another embodiment of the caricature generating system according to the present invention. The system of FIG. 2D has the same components as illustrated in the system of FIG. 2C, the extra description for each component is therefore omitted. The difference between the two systems is about the process sequence. In FIG. 2C, after the characteristics of the facial image are identified, the stroke process is prior to the facial image adjustment, while in the system of FIG. 2D, the sequence of two processes is reversed.

Figure 3A:
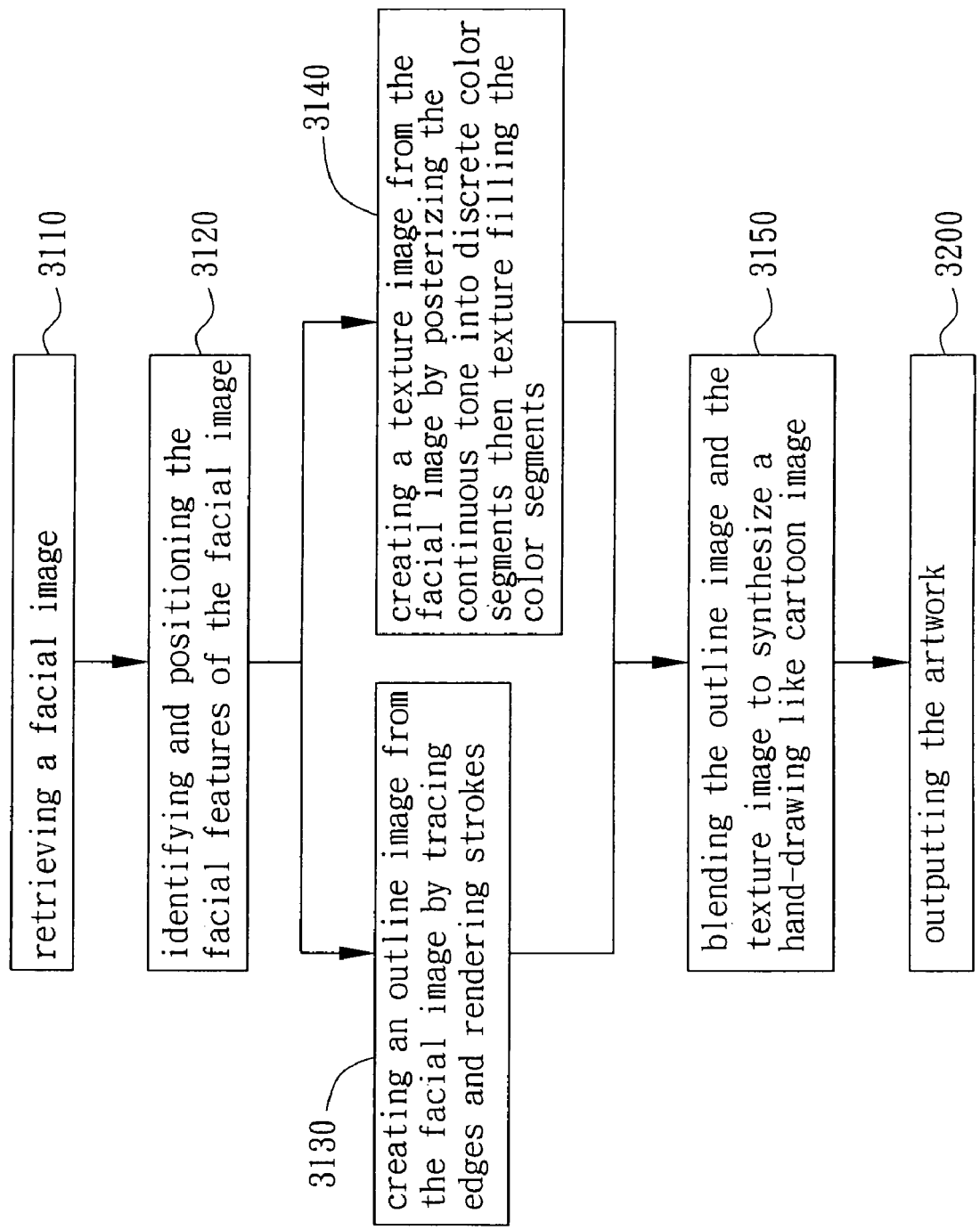
FIG. 3A is a flow chart of an embodiment of a caricature generating method according to the invention.

Please refer to FIG. 3A, an embodiment of a caricature generating method according to the present invention comprises the following steps:

Step 3110: retrieving a facial image;

Step 3120: identifying and positioning the facial features of the facial image;

Step 3130: creating an outline image from the facial image by tracing edges and rendering strokes;

Step 3140: creating a texture image from the facial image by posterizing the continuous tone into discrete color segments then texture filling the color segments;

Step 3150: blending the outline image and the texture image to synthesize a hand-drawing like cartoon image, and Step 3200: outputting the artwork.

Figure 3B:
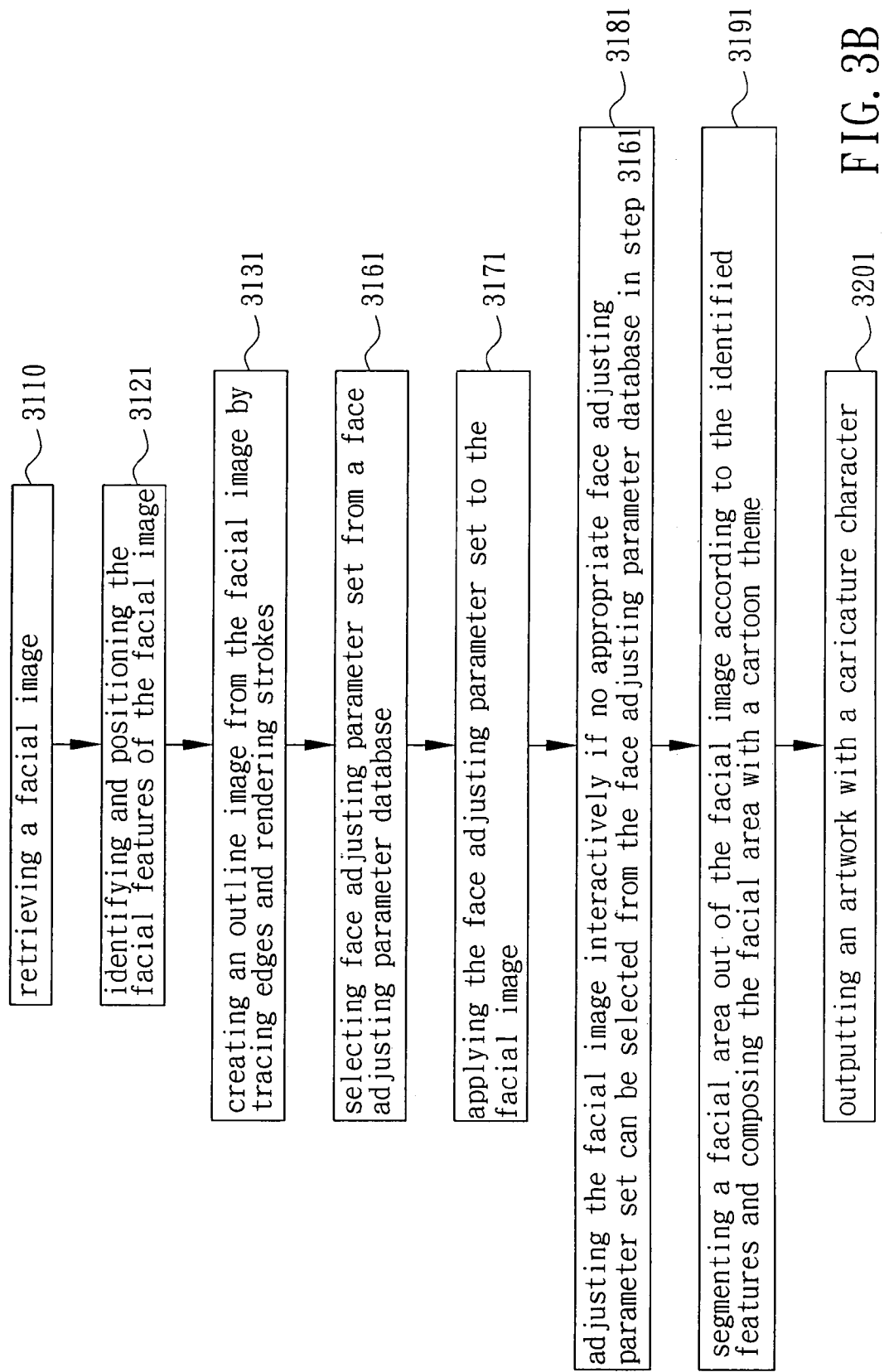
FIG. 3B is a flow chart of another embodiment of a caricature generating method according to the invention.

Referring to FIG. 3B, another embodiment of the caricature generating method comprises the following steps:

Step: 3111: retrieving a facial image;

Step: 3121: identifying and positioning the facial features of the facial image;

Step 3131: creating an outline image from the facial image by tracing edges and rendering strokes;

Step 3161: selecting face adjusting parameter set from a face adjusting parameter database;

Step 3171: applying the face adjusting parameter set to the facial image;

Step 3181: adjusting the facial image interactively if no appropriate face adjusting parameter set can be selected from the face adjusting parameter database in step 3161;

Step 3191: segmenting a facial area out of the facial image according to the identified features and composing the facial area with a cartoon theme; and Step 3201: outputting an artwork with a caricature character.

The step 3131 can be replaced with another step of creating a texture image from the facial image by a posterizing and texturing unit to create various cartoon effects. These two steps also can be included at the same time in one single method described in the embodiment of FIG. 3C.

Figure 3C:
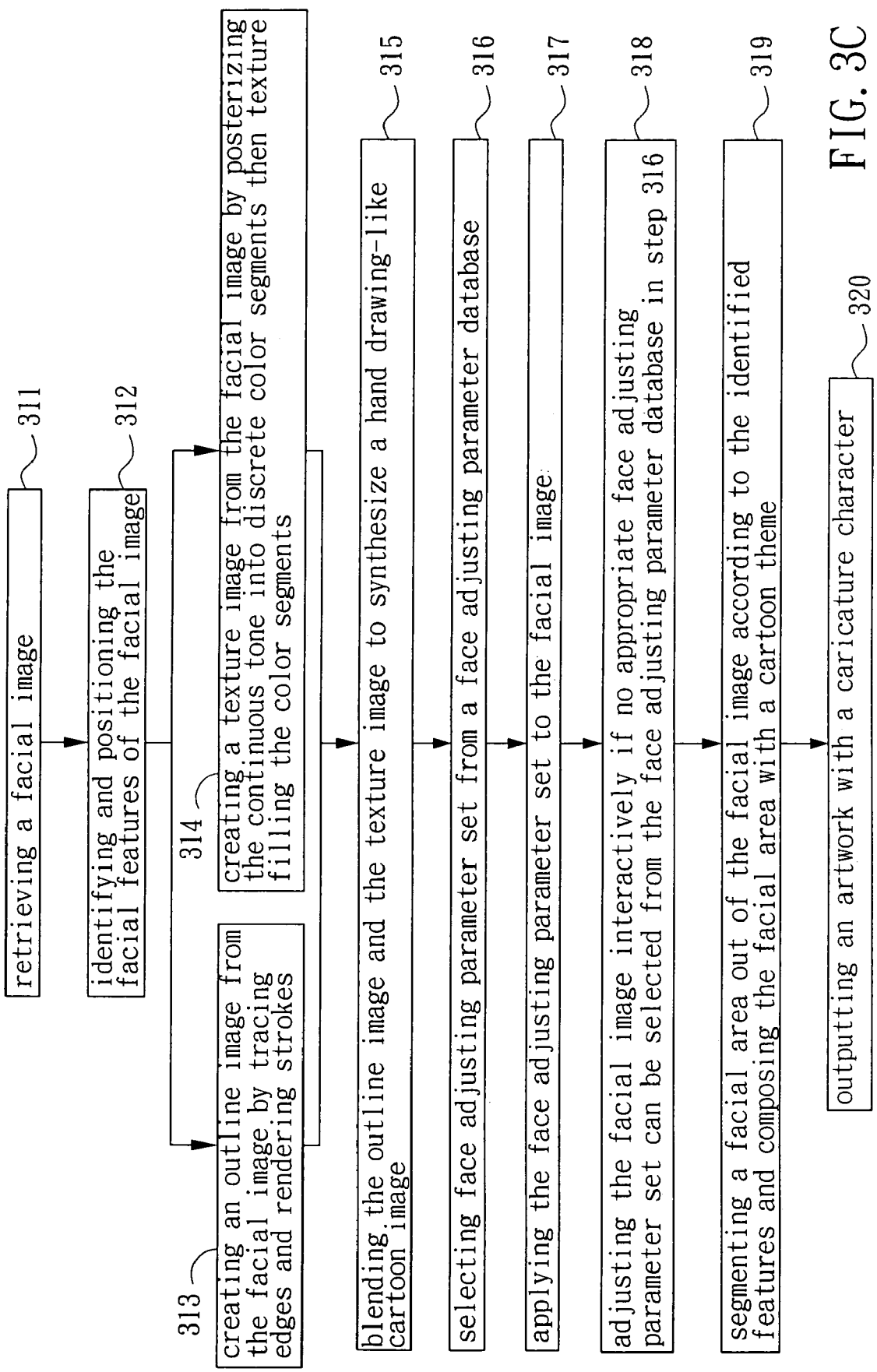
FIG. 3C is a flow chart of another embodiment of a caricature generating method according to the invention.

Referring to FIG. 3C, another embodiment of the caricature generating method comprises the following steps:

Step 311: retrieving a facial image;

Step 312: identifying and positioning the facial features of the facial image;

Step 313: creating an outline image from the facial image by tracing edges and rendering strokes;

Step 314: creating a texture image from the facial image by posterizing the continuous tone into discrete color segments then texture filling the color segments;

Step 315: blending the outline image and the texture image to synthesize a hand drawing-like cartoon image;

Step 316: selecting face adjusting parameter set from a face adjusting parameter database;

Step 317: applying the face adjusting parameter set to the facial image;

Step 318: adjusting the facial image interactively if no appropriate face adjusting parameter set can be selected from the face adjusting parameter database in step 316;

Step 319: segmenting a facial area out of the facial image according to the identified features and composing the facial area with a cartoon theme; and Step 320: outputting an artwork with a caricature character.

Figure 3D:
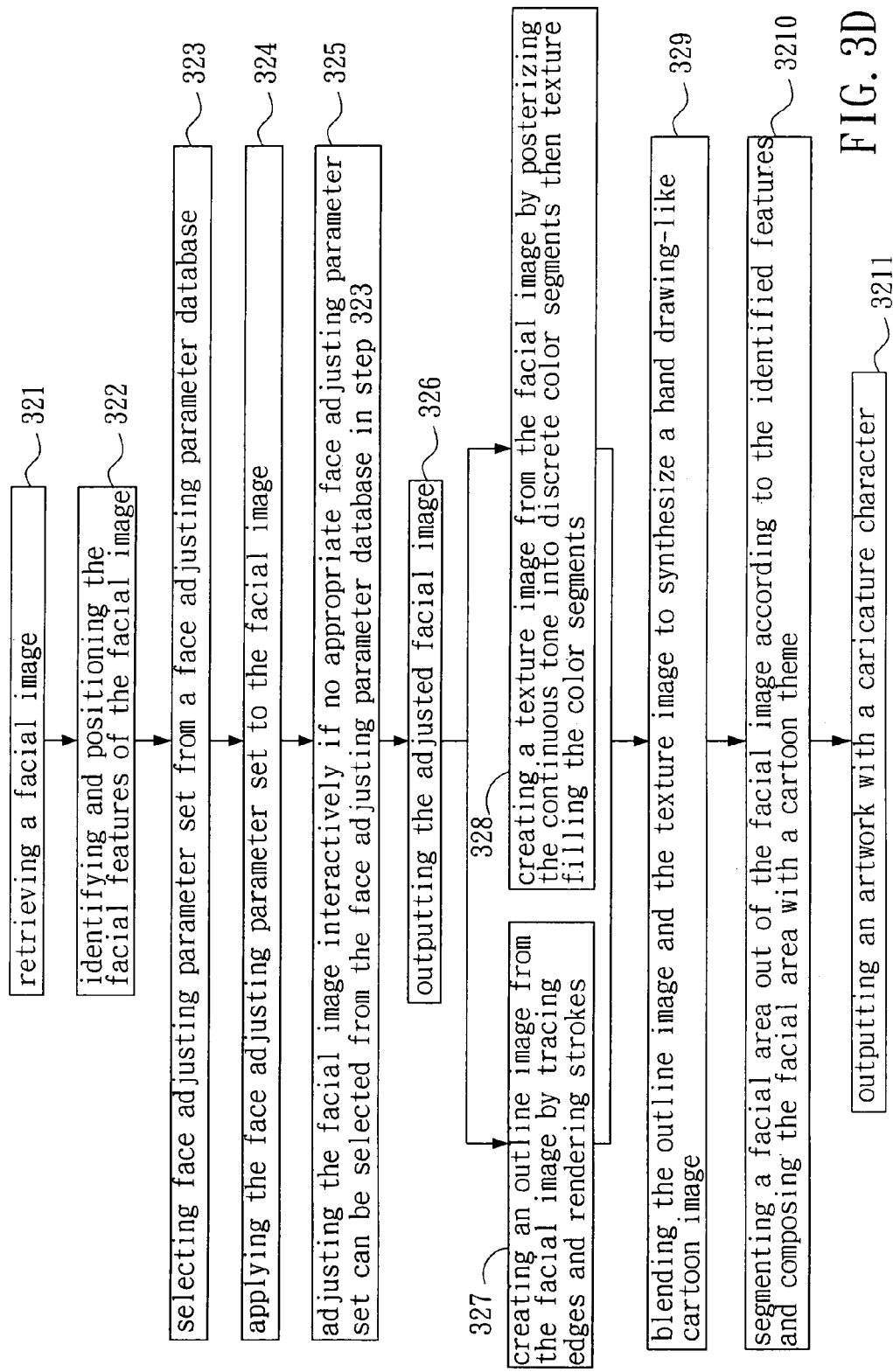
FIG. 3D is a flow chart of another embodiment of a caricature generating method according to the invention.

Referring to FIG. 3D, another embodiment of the caricature generating method comprises the following steps:

Step 321: retrieving a facial image;

Step 322: identifying and positioning the facial features of the facial image;

Step 323: selecting face adjusting parameter set from a face adjusting parameter database;

Step 324: applying the face adjusting parameter set to the facial image;

Step 325: adjusting the facial image interactively if no appropriate face adjusting parameter set can be selected from the face adjusting parameter database in step 323;

Step 326: outputting the adjusted facial image;

Step 327: creating an outline image from the facial image by tracing edges and rendering strokes;

Step 328: creating a texture image from the facial image by posterizing the continuous tone into discrete color segments then texture filling the color segments;

Step 329: blending the outline image and the texture image to synthesize a hand drawing-like cartoon image;

Step 3210: segmenting a facial area out of the facial image according to the identified features and composing the facial area with a cartoon theme; and Step 3211: outputting an artwork with a caricature character.

Comparing the embodiments in FIG. 3C and FIG. 3D, please notice that, in FIG. 3C, after identifying and positioning the facial features of the facial image, the creation of outline image can be prior to adjustment of the facial image, while in FIG. 3D, the creation of outline image is after the adjustment of the facial image.

Figure 4A:
FIGS. 4A to 4F are schematic views of applications of the invention.
Figure 4B:
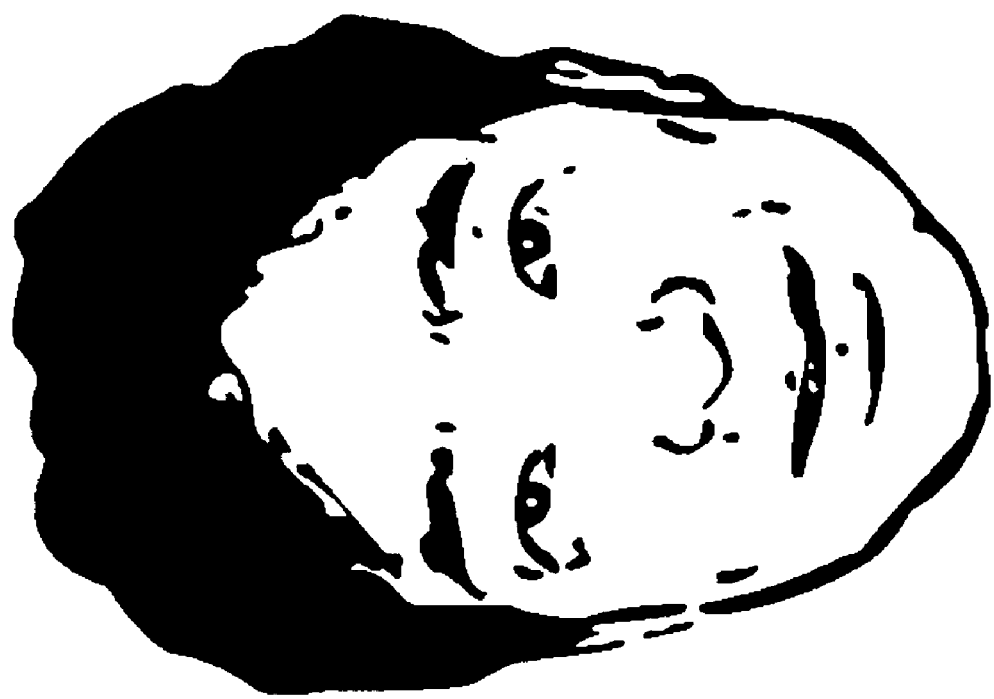
Figure 4C:
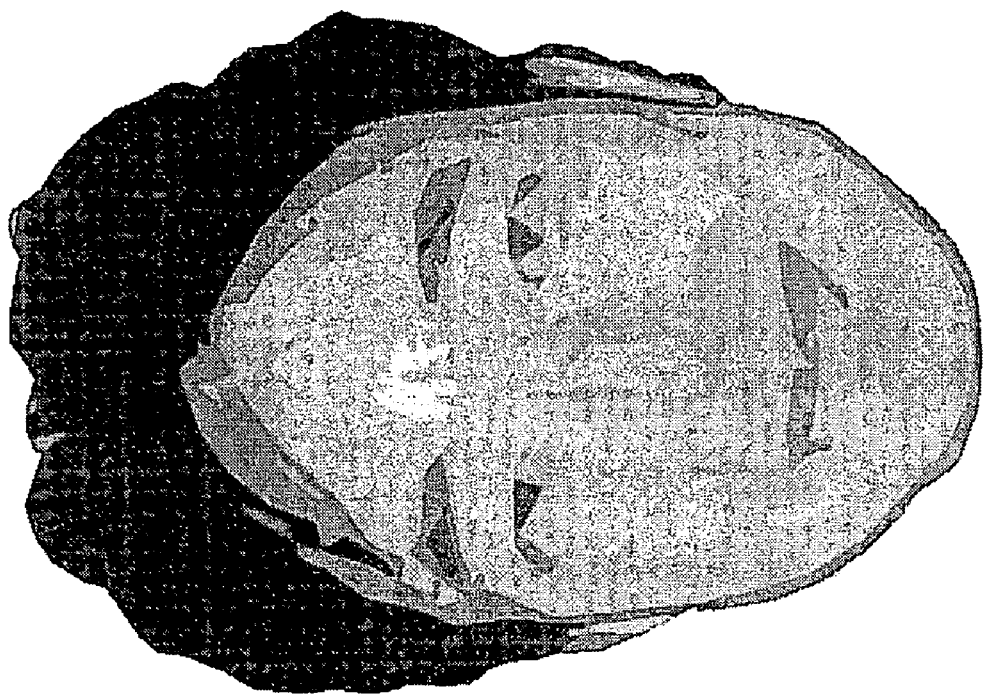
Figure 4D:
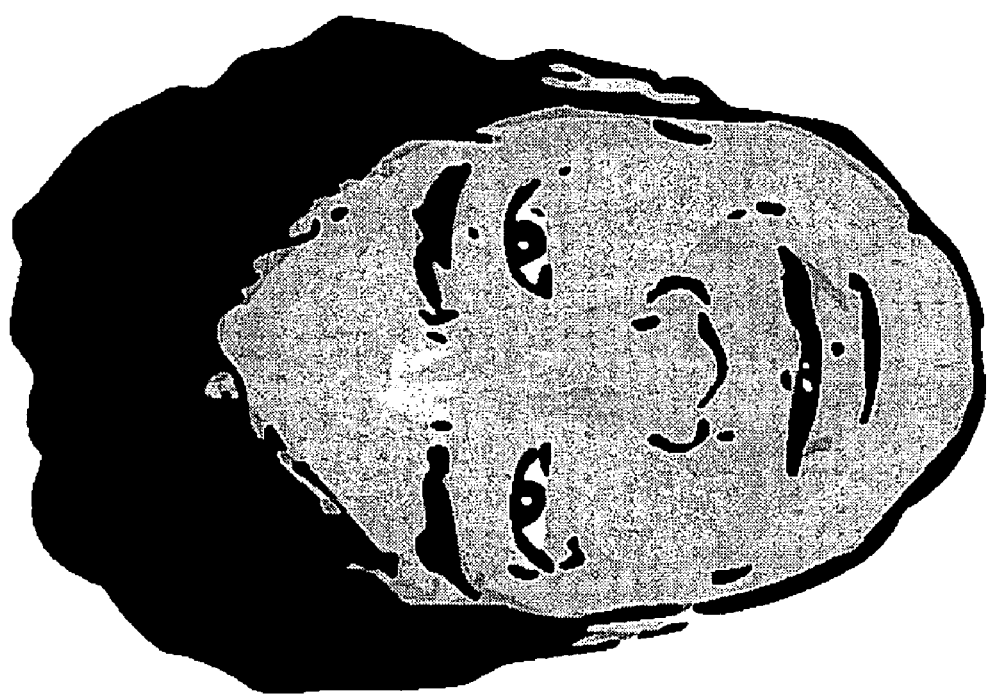
Figure 4E:
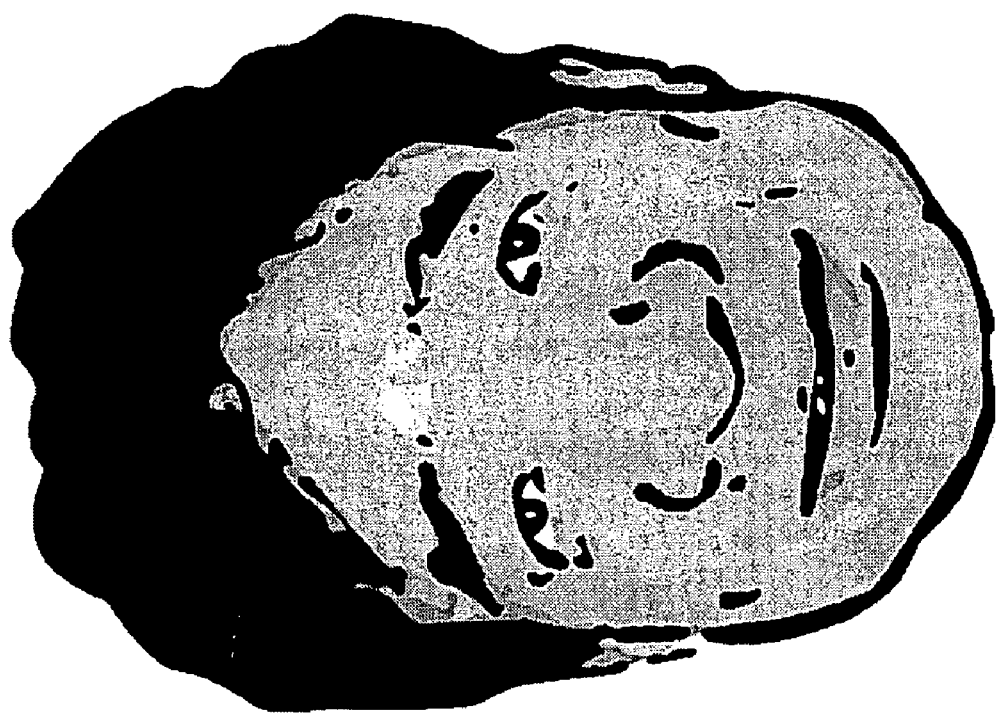
Figure 4F:

Referring to FIGS. 4A to 4F, an example is described to show a raw image converted to a caricature. FIG. 4A shows a raw image. FIG. 4B shows an outline image processed by an edge-tracing and stroking unit of the present invention. FIG. 4C shows a texture image processed by a posterizing and texturing unit of the present invention. FIG. 4D shows an image generated by an image blending unit. FIG. 4E shows an image processed by face adjusting parameter set from a face adjusting parameter database of the present invention. FIG. 4F shows a caricature artwork created by the cartoon theme composition unit of the invention.

As mentioned above, the caricature generating system of the invention comprises an image acquisition unit capturing a facial image; a feature detecting unit identifying and positioning the features of the facial image; an edge-tracing and stroking unit detecting the contours of the facial image and converting the facial image into an outline image with artistic stroking styles; based on the information detected from the facial image, various portions of the facial image are given different parameter values, for example, thick stroke can be used in the outline of the face and thin stroke can be used in facial features such as eyes, mouth and nose; a styling parameters database comprising a plurality of styling parameters (including the control parameters for edge tracing, stroking, posterizing, and texturing) which can be translated into parameter sets of oil paint, pastel, a wax crayon, marker pen, pen drawing, tempera paint, glue color paint, halftone, watercolor paint, block print, woodcut, color pencil, charcoal and their combinations; a posterizing and texturing unit posterizing the continuous tone of the facial image and converting the facial image into a texture image with various texture filling styles, based on the information detected from the facial image, various portions of the facial image are given different effects, for example, thin line and fine texture can be applied in facial feature such as eyes, mouth and nose while thick line and rough texture can be used in other portions of the face; an image blending unit blending the outline image and the texture image to synthesize a hand drawing-like cartoon image, the combination of different outline stroking, texturing and blending gives images with different paint effects, such as, oil paint, pastel, a wax crayon, marker pen, pen drawing, tempera paint, glue color paint, halftone, watercolor paint, block print, woodcut, color pencil, charcoal; a facial adjusting parameter set processing unit providing face adjusting parameter set from a face adjusting parameter database, a facial image adjusting unit adjusting the facial image interactively and saving facial image adjusting parameter set into the face adjusting parameter database, a face adjusting parameter database comprising a plurality of face adjusting parameter sets, a cartoon theme database comprising a plurality of cartoon themes, and an cartoon theme composition unit for segmenting a facial area out of the facial image according to the identified features and composing the facial area with a cartoon theme. The face adjusting parameter sets created by software or manually include facial feature parameters for modifying the shapes and proportions of facial features like eyes, mouth and nose and facial expression parameters to adjust the expression of a facial image. The cartoon themes include various cartoon backdrops and outfits into which the facial image can be placed to create various cartoon artworks. Moreover, the face adjusting parameter set and cartoon themes can be used repeatedly and directly applied to facial images. Thus, as a result, with the present invention, the traditional disadvantages in the caricature generating system of prior art can be overcome, the caricture production time can be saved extremely and the process can be simplified for non-professional use, therefore, the caricature generating efficiency is improved.

While the invention has been described by way of example and in terms of preferred embodiment, it is to be understood that the invention is not limited thereto. To the contrary, it is intended to cover various modifications and similar arrangements, as would be apparent to those skilled in the art. Therefore, the scope of the appended claims should be accorded the broadest interpretation so as to encompass all such modifications and similar arrangements.

What is claimed is:

1. A caricature generating system, comprising:

an image acquisition unit for capturing a facial image;

a feature detecting unit for identifying and positioning the features of the facial image;

an edge-tracing and stroking unit for detecting the contours of the facial image and converting the facial image into an outline image with artistic stroking styles;

a posterizing and texturing unit for posterizing the continuous tone of the facial image and converting the facial image into a texture image with various texture filling styles;

a styling parameter database comprising a plurality of styling parameters including a plurality of control parameters for edge-tracing, stroking, posterizing, and texturing;

an image blending unit for blending the outline image and the texture image to synthesize a hand-drawing like cartoon image;

a facial adjusting parameter set processing unit for processing face adjusting parameter sets from a face adjusting parameter database;

a facial image adjusting unit for adjusting geometry and color information of the facial image interactively;

a facial adjusting parameter database comprising a plurality of facial adjusting parameter sets;

a cartoon theme composition unit segmenting a facial area out of the facial image according to the identified features and composing the facial area with a cartoon theme; and a cartoon theme database comprising a plurality of cartoon theme, wherein a plurality of combinations of styling parameters can be translated into the parameter sets of oil paint, pastel, a wax crayon, marker pen, pen drawing, tempera paint, glue color paint, halftone, watercolor paint, block print, woodcut, color pencil and charcoal.

* * * * *